No. 615,657. Patented Dec. 6, 1898.
E. H. WEAVER.
REEL.
(Application filed May 12, 1898.)
(No Model.)
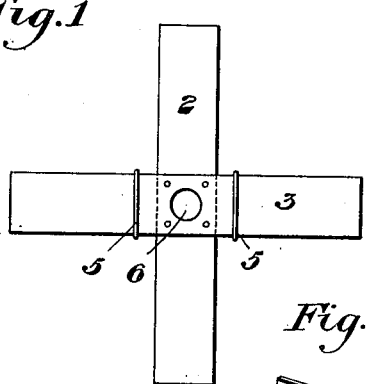
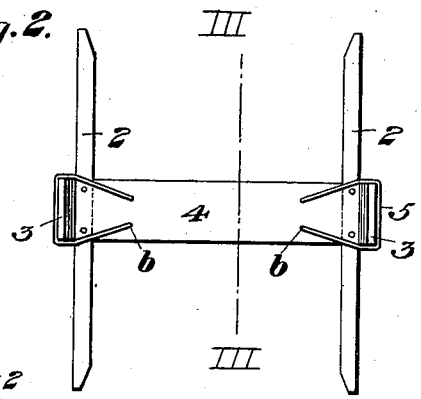
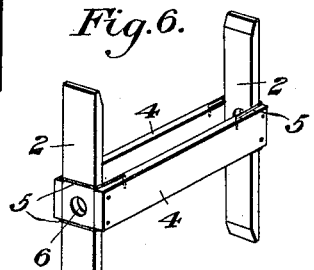
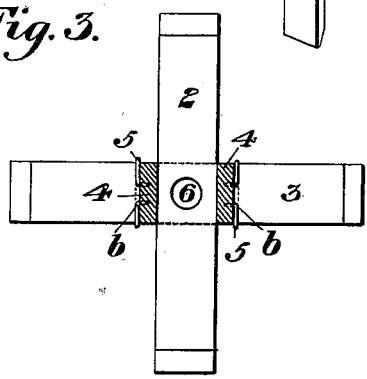
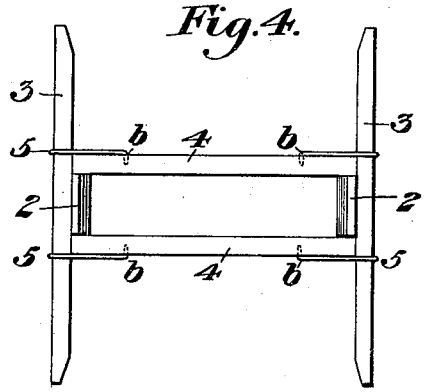
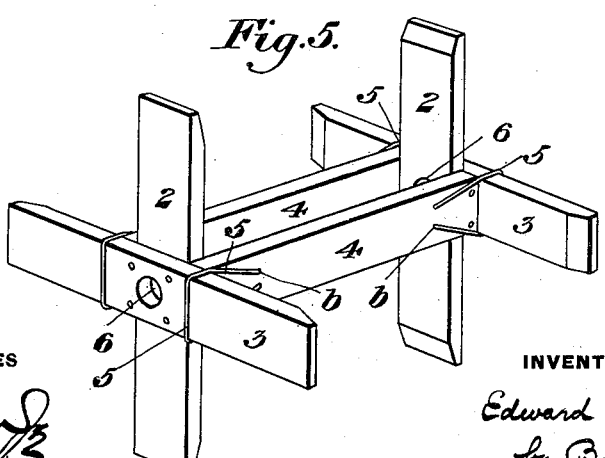
WITNESSES
INVENTOR
Edward H. Weaver
by Bakewell & Bakewell
his Attorneys.
THE NORRIS PETERS CO., PHOTO-LITHO., WASHINGTON, D. C.

UNITED STATES PATENT OFFICE.

EDWARD H. WEAVER, OF CRAFTON, PENNSYLVANIA, ASSIGNOR TO THE OLIVER WIRE COMPANY, OF PITTSBURG, PENNSYLVANIA.

REEL.

SPECIFICATION forming part of Letters Patent No. 615,657, dated December 6, 1898.

Application filed May 12, 1898. Serial No. 680,498. (No model.)

*To all whom it may concern:*

Be it known that I, EDWARD H. WEAVER, of Crafton, in the county of Allegheny and State of Pennsylvania, have invented a new and useful Improvement in Reels, of which the following is a full, clear, and exact description, reference being had to the accompanying drawings, forming part of this specification, in which—

Figure 1 shows in end elevation a spool constructed in accordance with my invention. Fig. 2 is a side elevation thereof. Fig. 3 is a vertical section on the line III III of Fig. 2. Fig. 4 is a top plan view. Fig. 5 is a perspective view. Fig. 6 is a perspective view of a modified construction.

The object of my invention is to provide a spool for wire fencing, rope, &c., which shall be strong and durable and shall overcome difficulties incident to prior constructions, which often occasion loss and inconvenience when the spools become damaged in transport.

As shown in the drawings, each end of the spool is constituted by pieces or bars 2 3, preferably of wood, secured together in the form of a cross, and these are connected by bars 4 4, extending parallel to each other and nailed to the edges of the pieces 2 2. The pieces 3 are also secured to the pieces 4 by bands or wires 5, constituting stays which are passed around the pieces 3 and the ends of which are bent inwardly in the form of staples and are driven into the sides of the bars 4, as at *b b*. The ends of the spool are preferably perforated, as at 6. By thus connecting the crossed end pieces to the bars 4 by the wires or bands 5 I impart to the spool great strength and durability. The wires or bands hold the cross-pieces 3 and the bars 4 firmly together, and the ends of the spool are thus secured and braced so rigidly that there is little danger of breakage in transport. The ends of the wires or bands 5 preferably extend inwardly far enough to be wrapped by the wire and thus concealed.

In Fig. 6 I show a modified construction, in which the cross-pieces 3 3 are omitted, in which case the end pieces 2 2 are secured by stay wires or bands 5, the inwardly-bent portions of which are driven into the edges of the bars 4, as shown.

I claim—

1. A spool having end pieces, intermediate bars connecting the end pieces, and bands secured to the end pieces and also to the said intermediate bars, whereby the end pieces are fixed to the bars; substantially as described.

2. A spool comprising crossed end pieces 2, 3, intermediate connecting-bars 4, 4 applied to the pieces 2, and bands or wires passing around the end pieces and fixed to the connecting-pieces.

3. A spool comprising crossed end pieces 2, 3, intermediate connecting-bars 4, 4 applied to the pieces 2, and bands or wires passing around the end pieces and fixed to the connecting-bars, said bands or wires extending inwardly far enough to be wrapped by the material for which the spool is used.

4. A spool comprising crossed end pieces 2, 3, intermediate connecting-bars 4, 4, applied to the pieces 2, and bands or wires passing around the end pieces 3, and fixed to the connecting-pieces, whereby displacement of the end pieces is prevented.

In testimony whereof I have hereunto set my hand.

EDWARD H. WEAVER.

Witnesses:
W. R. THOMPSON,
G. I. HOLDSHIP.